United States Patent [19]
Barker

[11] Patent Number: 5,908,716
[45] Date of Patent: Jun. 1, 1999

[54] LITHIUM—CONTAINING SULFATES, METHOD OF PREPARATION AND USES THEREOF

[75] Inventor: Jeremy Barker, Henderson, Nev.

[73] Assignee: Valence Technology, Inc., Henderson, Nev.

[21] Appl. No.: 08/839,728

[22] Filed: Apr. 15, 1997

[51] Int. Cl.$^6$ ......................................... H01M 4/58
[52] U.S. Cl. .................. 429/218.1; 429/221; 429/223; 429/224; 429/231.5; 423/551; 423/558
[58] Field of Search .................. 423/518, 551, 423/558; 429/218, 221, 223, 224

[56] References Cited

U.S. PATENT DOCUMENTS

| | | | |
|---|---|---|---|
| 2,860,951 | 11/1958 | Cunningham | 423/551 X |
| 3,779,732 | 12/1973 | Spanoudis | 65/31 |
| 3,959,000 | 5/1976 | Nakagawa et al. | 106/52 |
| 3,992,179 | 11/1976 | Simmons | 65/30 |
| 5,336,572 | 8/1994 | Koksbang | 429/218 |
| 5,418,091 | 5/1995 | Gozdz et al. | 429/252 |
| 5,425,932 | 6/1995 | Tarascon | 423/599 |
| 5,456,000 | 10/1995 | Gozdz et al. . | |
| 5,460,904 | 10/1995 | Gozdz et al. . | |
| 5,695,893 | 12/1997 | Arai et al. | 423/551 X |

FOREIGN PATENT DOCUMENTS

WO 91/07352  5/1991  WIPO .................................... 423/518

OTHER PUBLICATIONS

Dana's System of Mineralogy, 7th Edition, J. Wiley, New York, New York, pp. 390–394, 456–458, and 604–605, 1963 (Month N/A).

K. Mereiter, TMPM Tschermaks Min. Petr. Mitt. 23, 317–321, 1076(Month Unknown).

S. Boghosian, R. Fehrmann, and K. Nielsen, Synthesis and Crystal Structure of $Na_3V(SO_4)_3$ Spectroscopic Characterization of $Na_3V(SO_4)_3$ and $NaV(SO_4)_2$, Acta Chemica Scandinavica, 48, 724–731, 1994 (Month Unknown).

Abstract: L.A. Kochubei, E.V. Margulis, F.I. Vershinina, and S.D. Rybalkina, "Sodium Sulfate–Chromium Sulfate ($Cr_2(SO_4)_3$) and Sodium Sulfate–Aluminum Sulfate ($Al_2(SO_4)_3$) Systems", Zh. Neorg. Khim., 28(10), 1983 (Month Unknown).

C. Delmas, J. Braconnier, A. Maazaz, and P. Hagenmuller, "Soft Chemistry in $A_xMO_2$ Sheet Oxides", Revue, De Chimie Minerale, t. 19, 343–351, 1982 (Month Unknown).

B. Fuchs and S. Kemmler–Sack, "Synthesis of $LiMnO_2$ and $LiFeO_2$ in Molten Li Halides", Solid State Ionics, 68, 279–285, 1994 (Monthe Unknown).

J. Bernard, P. Cochot, and F. Theobold, "Preparation and Radiocrystallographic Study of Double Sulfates of the Formula $M'_3M''(SO_4)_3$", Lab. Chim. Phys., Fac. Sci., Besancon, Fr. SO., published in the Journal C.R. Acad. Sci., Ser. C (1970), 270(12), 1119–1122 (Mar. 1970).

S. Okada, H. Arai, K. Asakura, Y. Sakurai, J. Yamaki, K.S. Nanjundaswamy, A.K. Padhi, C. Masquelier, and J.B. Goodenough, Abstract No. 120—"Characteristics of NASICON—related 3D Framework Cathodes, $Li_3Fe_2(PO_4)_3$, $Li_3V_2(PO_4)_3$ and the solid Solution $Li_3FeV(PO_4)_3$", Meeting Abstracts, vol. 96–2, The Electrochemical Society, Inc., Oct. 6–11, 1996.

A.K. Padhi, K.S. Nanjundaswamy, S. Okada, C. Masquelier, and J.B. Goodenough, Abstract No. 128—"Effect of Structure on the Redox Couples in Iron Phosphates", Meeting Abstracts, vol. 96–2, The Electrochemical Society, Inc., Oct. 6–11, 1996.

S. Kikkawa, H. Ohkura, and M. Koizumi, Ion Exchange of Layered $NaFeO_2$, Materials Chemistry and Physica, 18, 375–380, 1987 (Month Unknown).

*Primary Examiner*—Stephen Kalafut
*Attorney, Agent, or Firm*—Young & Basile, P.C.

[57] ABSTRACT

The invention provides a battery having an electrode active material comprising a mixed-metal sulfate compound. The mixed-metal consists of at least one alkali metal and at least one transition metal. Preferably, the sulfate compound is a polysulfate having more than one $SO_4$ group. The invention also provides novel lithium-metal-sulfate compounds and electrodes comprising such novel compounds.

18 Claims, 1 Drawing Sheet

LITHIUM— CONTAINING SULFATES, METHOD OF PREPARATION AND USES THEREOF

FIELD OF THE INVENTION

This invention relates to improved materials usable as electrode active materials, method for making such improved materials, and electrodes formed from it for electrochemical cells in batteries.

BACKGROUND OF THE INVENTION

Lithium batteries are prepared from one or more lithium electrochemical cells containing electrochemically active (electroactive) materials. Such cells typically include an anode (negative electrode), a cathode (positive electrode), and an electrolyte interposed between spaced apart positive and negative electrodes. Batteries with anodes of metallic lithium and containing metal chalcogenide cathode active material are known. The electrolyte typically comprises a salt of lithium dissolved in one or more solvents, typically nonaqueous (aprotic) organic solvents. Other electrolytes are solid electrolytes typically called polymeric matrixes that contain an ionic conductive medium, typically a metallic powder or salt, in combination with a polymer that itself may be ionically conductive which is electrically insulating. By convention, during discharge of the cell, the negative electrode of the cell is defined as the anode. Cells having a metallic lithium anode and metal chalcogenide cathode are charged in an initial condition. During discharge, lithium ions from the metallic anode pass through the liquid electrolyte to the electrochemical active (electroactive) material of the cathode whereupon they release electrical energy to an external circuit.

It has recently been suggested to replace the lithium metal anode with an intercalation anode, such as a lithium metal chalcogenide or lithium metal oxide. Carbon anodes, such as coke and graphite, are also intercalation materials. Such negative electrodes are used with lithium-containing intercalation cathodes, in order to form an electroactive couple in a cell. Such cells, in an initial condition, are not charged. In order to be used to deliver electrochemical energy, such cells must be charged in order to transfer lithium to the anode from the lithium-containing cathode. During discharge the lithium is transferred from the anode back to the cathode. During a subsequent recharge, the lithium is transferred back to the anode where it reintercalates. Upon subsequent charge and discharge, the lithium ions ($Li^+$) are transported between the electrodes. Such rechargeable batteries, having no free metallic species are called rechargeable ion batteries or rocking chair batteries. See U.S. Pat. Nos. 5,418,090; 4,464,447; 4,194,062; and 5,130,211.

Preferred positive electrode active materials include $LiCoO_2$, $LiMn_2O_4$, and $LiNiO_2$. The cobalt compounds are relatively expensive and the nickel compounds are difficult to synthesize. A relatively economical positive electrode is $LiMn_2O_4$, for which methods of synthesis are known, and involve reacting generally stoichiometric quantities of a lithium-containing compound and a manganese containing compound. The lithium cobalt oxide ($LiCoO_2$), the lithium manganese oxide ($LiMn_2O_4$), and the lithium nickel oxide ($LiNiO_2$) all have a common disadvantage in that the charge capacity of a cell comprising such cathodes suffers a significant loss in capacity. That is, the initial capacity available (amp hours/gram) from $LiMn_2O_4$, $LiNiO_2$, and $LiCoO_2$ is less than the theoretical capacity because less than 1 atomic unit of lithium engages in the electrochemical reaction. Such an initial capacity value is significantly diminished during the first cycle operation and such capacity further diminishes on every successive cycle of operation. The specific capacity for $LiMn_2O_4$ is at best 148 milliamp hours per gram. As described by those skilled in the field, the best that one might hope for is a reversible capacity of the order of 110 to 120 milliamp hours per gram. Obviously, there is a tremendous difference between the theoretical capacity (assuming all lithium is extracted from $LiMn_2O_4$) and the actual capacity when only 0.8 atomic units of lithium are extracted as observed during operation of a cell. For $LiNiO_2$ and $LiCoO_2$ only about 0.5 atomic units of lithium is reversibly cycled during cell operation. Many attempts have been made to reduce capacity fading, for example, as described in U.S. Pat. No. 4,828,834 by Nagaura et al. However, the presently known and commonly used, alkali transition metal oxide compounds suffer from relatively low capacity. Therefore, there remains the difficulty of obtaining a lithium-containing chalcogenide electrode material having acceptable capacity without disadvantage of significant capacity loss when used in a cell.

SUMMARY OF THE INVENTION

In one embodiment, the invention provides novel alkali metal transition metal sulfate compounds, more specifically, lithium-containing sulfate materials having a high proportion of lithium per formula unit, that is, having a high proportion of lithium per formula unit of the material. Upon electrochemical interaction, such material deintercalates alkali metal ions, preferably lithium ions, and is capable of reversibly cycling such ions. The invention provides a rechargeable lithium battery which comprises an electrode formed from the novel lithium-containing sulfate compounds, desirably lithium-metal-sulfates, and preferably lithium-transition metal-sulfates. Methods for making the novel sulfate compounds, and methods for using such sulfate compounds in electrochemical cells are also provided. Accordingly, the invention provides a rechargeable lithium battery which comprises an electrolyte; a first electrode having a compatible active material; and a second electrode comprising the novel sulfate materials. The novel materials, preferably used as a positive electrode active material, reversibly cycle ions with the compatible negative electrode active material. The sulfate compounds have at least 1 atomic unit of lithium per formula unit of the compound in an as prepared, initial condition. Desirably, the sulfate has 2 or more atomic units of lithium per formula unit of the sulfate compound. Upon electrochemical interaction, the proportion of lithium ions per formula unit becomes less due to deintercalation from the material.

In another embodiment, the invention provides an alkali metal-containing sulfate positive electrode active material having a high proportion of electroactive alkali per formula unit of the sulfate material. The alkali ion is removable upon electrochemical interaction as described above in connection with the lithium alkali metal ion. In the most generic embodiment, the positive electrode active material comprises a sulfate compound represented by the nominal general formula $A_xM_y(SO_4)_z$ where x, y, and z are each greater than 0. The element A is selected from the group of alkali metals, and M represents a metal, preferably a transition metal. Preferably, x is up to about 3, z is up to about 3, and y is less than 2 and most preferably y is 1. Alternatively, M represents a mixture of at least two metals, M1 and M2, in respective proportions of y1 and y2 where the sum of y1 plus y2 is 1. In one embodiment, A represents a single alkali metal. Desirably, A is sodium or lithium and preferably A is lithium. In one preferred embodiment, x is 3 and z is 3. In another embodiment x is 1 and z is 1. In another embodiment, A represents a mixture of at least two alkali metals, A1 and A2 in respective proportions of x1 and x2, where the sum of x1 plus x2 is less than or equal to about 3. The metal M is preferably selected from the group of chromium (Cr), iron (Fe), manganese (Mn), cobalt (Co), nickel (Ni), and vanadium (V). When the metal M consists of two metals, M1 and M2, preferably M1 is vanadium and M2 is iron, each present in a combined amount of approximately 1 atomic unit.

It is preferred that the electrode active material of the invention is $Li_3M_1(SO_4)_3$ or $Li_1M_1(SO_4)_2$. Among the most desired compounds are $Li_3V_1(SO_4)_3$, $Li_3Fe_1(SO_4)_3$, $Li_3V_{y1}Fe_{y2}(SO_4)_3$, $Li_1V_1(SO_4)_2$, $Li_1Fe_1(SO_4)_2$, $Li_1V_{y1}Fe_{y2}(SO_4)_2$. These compound formulas are nominal formulas because the relative proportion of atomic species may vary slightly, on the order of 2 percent to 5 percent, or more typically, 1 percent to 3 percent. These lithium-containing compounds are not known to have previously existed and may be formed from sodium counterparts by ionic substitution beginning with the respective starting compounds $Na_3M_1(SO_4)_3$ and $Na_1M_1(SO_4)_2$. In addition to each of the aforesaid desired lithium-containing compounds, each of said compounds is a mixed alkali compound where some sodium is present at crystal sites in place of the lithium, due to incomplete ionic substitution from the starting $Na_3M_1(SO_4)_3$ and $Na_1M_1(SO_4)_2$ compounds. Accordingly, the lithium-metal-sulfate active material of the invention is prepared by a series of steps in which a precursor sodium-based compound undergoes quantitative ionic substitution to provide $Li_xM_y(SO_4)_z$. A typical chemical or electrochemical ion substitution method will achieve replacement of at least 90 atomic percent of the Na with Li. Depending on the method, replacement of at least 95 atomic percent of the Na is achieved. Typically, it is necessary to repeat the method to achieve close to complete substitution of Na by Li. In cases where there is a mixture of metal elements, such as Fe/V or Li/Na, the sulfate compounds of the invention are solid solutions. It is preferred that each metal M be capable of an oxidation state higher than that initially present in the lithium sulfate compound as prepared. Desirably, if a mixture of metals M is used, each has more than one oxidation state and each is oxidizable from the state initially present in the sulfate compound. Although the metals M may be selected from the group of metal and semi-metal elements, it is preferred that the metal element M be a transition metal.

The metal sulfate compounds of the invention may be alternatively represented by the nominal general formula $A_{(x-a)}M_y(SO_4)_z$ where the values of x, y, and z are as stated earlier. The variable "a" in the parenthetical expression in the general formula signifies capability to deintercalate and reinsert lithium. In an initial, as prepared condition, a is 0. When the sulfate compound is cycled in a battery, upon deintercalation, the value of a is greater than 0 and less than or equal to the initial, as prepared condition, value of x herein defined.

The active material of the counter-electrode is any material compatible with the sulfate compound of the invention. Where the sulfate compound is used as a positive electrode active material, metallic lithium may be used for the counter-electrode active material. However, the advantage of the present sulfate material is that they already contain lithium. Therefore, they may advantageously be used with non-lithium-containing negative electrode active material. Desirably, the negative electrode is a non-metallic intercalation material. Exemplary negative electrode materials include metal oxide, particularly transition metal oxide, metal chalcogenide, carbon, graphite, and mixtures thereof. The term "carbon" encompasses petroleum coke, disordered carbon, and hard carbons. It is preferred that the anode active material comprises graphite, coke, or disordered carbon.

The present invention resolves the capacity problem posed by widely used cathode active material. It is evident that the sulfate active materials of the invention, as prepared, have up to 3 atomic units of lithium (alkali metal) per formula unit of the compound. This means that there is essentially excess lithium (alkali metal) provided to satisfy irreversible capacity loss, and then significant quantity of lithium (alkali metal) is still available for reversible cyclic operation. Therefore, optimized cells containing the preferred lithium-metal-sulfates of the invention potentially have performance better than the presently used lithium metal oxide compounds. Such presently used compounds, for example, $LiCoO_2$ and $LiNiO_2$, cycle only 0.5 to 0.6 atomic units of lithium. This is much less than the theoretical capacity. Advantageously, the novel lithium-metal-sulfate compounds of the invention are relatively easily to make, and readily adaptable to commercial production, are relatively low in cost, and have very good specific capacity.

Objects, features, and advantages of the invention include an improved electrochemical cell or battery based on lithium which has improved charging and discharging characteristics, a large discharge capacity, and which maintains its integrity during cycling. Another object is to provide a cathode active material which combines the advantages of large discharge capacity and with relatively lesser capacity fading. It is also an object of the present invention to provide positive electrodes which can be manufactured more economically and relatively more conveniently, rapidly, and safely than present positive electrodes which react readily with air and moisture. Another object is to provide a method for forming cathode active material which lends itself to commercial scale production providing for ease of preparing large quantities.

These and other objects, features, and advantages will become apparent from the following description of the preferred embodiments, claims, and accompanying drawings.

DETAILED DESCRIPTION OF THE PREFERRED EMBODIMENTS

Figure 1:
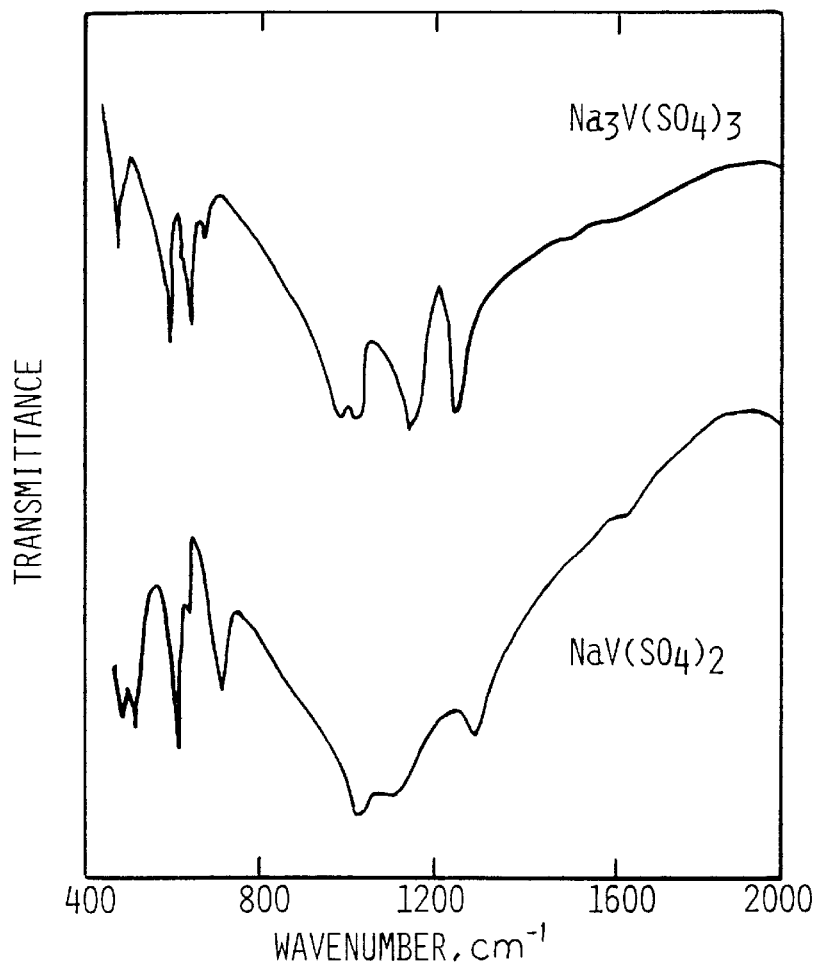
FIG. 1 contains graphs of infrared spectra of $Na_3V(SO_4)_3$ and $NaV(SO_4)_2$ powders in pressed KBr disks at room temperature. Resolution, ca. 5 $cm^{-1}$.

The present invention provides alkali metal-containing sulfate materials, preferably lithium-metal-sulfates, which are usable as electrode active materials. More generically, the invention provides electrodes and electrochemical cells with electrodes containing the alkali metal sulfate materials where electrochemical energy is provided upon deintercalation of the alkali from the sulfate of the generic formula $A_xM_y(SO_4)_z$. Here x, y, and z are each greater than 0, A represents an alkali metal or a mixture of at least two alkali metals, M represents a transition metal or a mixture of at least two transition metals. Preferably, $x \leq 3$; $z \leq 3$; and $y \leq 2$. Most preferably, y is 1. Where a mixture of transition metals (M) is used, they collectively constitute the equivalent of about 1 atomic unit. Where a mixture of alkali metals (A) is used, they collectively constitute the equivalent of up to about 3 atomic units.

In one embodiment, the electrode has an active material comprising a sulfate compound represented by the general formula $A_xM_y(SO_4)_z$; A represents an alkali metal (A1) or a mixture of at least two alkali metals (the series A1 ... An) and the total amount of alkali metal is x atomic units, where x is greater than 0 and less than or equal to about 3; M represents a transition metal (M1) or a mixture of at least two transition metals (the series M1 ... Mn) and the total amount of transition metal is y atomic units, where y is about 1; and z is greater than 0 and less than or equal to about 3. Preferably A is lithium, sodium, or mixtures thereof; preferably the atomic amount of lithium (x1) is greater than sodium (x2). Preferably M is selected from Cr, Fe, V, Mn, Co, Ni, and mixtures thereof.

More specifically, the invention provides a compound of the general formula $A1_{x1}A2_{x2}M1_{y1}M2_{y2}(SO_4)_z$. This encompasses compound $Li_{x1}Na_{x2}M(SO_4)_z$, where $0<x1\leq3$, $0\leq x2\leq x1$, and the sum of x1 plus x2 is greater than 0 and less than or equal to 3; and M is selected from the group defined above. Representative compounds include $Li_3V(SO_4)_3$, $Li_3Fe(SO_4)_3$, $Li_3Cr(SO_4)_3$, $Li_3V_{y1}Fe_{y2}(SO_4)_3$, $Li_1V_1(SO_4)_2$, $Li_1Fe_1(SO_4)_2$, $Li_1Cr(SO_4)_3$, $Li_1V_{y1}Fe_{y2}(SO_4)_3$, $Li_{x1}Na_{x2}V(SO_4)_3$, $Li_{x1}Na_{x2}Fe(SO_4)_3$, $Li_{x1}Na_{x2}Cr(SO_4)_3$, $Li_{x1}Na_{x2}V_{y1}Fe_{y2}(SO_4)_3$, $Li_{x1}Na_{x2}V_1(SO_4)_2$, $Li_{x1}Na_{x2}Fe_1(SO_4)_2$, $Li_{x1}Na_{x2}Cr(SO_4)_3$, $Li_{x1}Na_{x2}V_{y1}Fe_{y2}(SO_4)_3$; where y1 and y2 are each greater than 0, and the sum of y1 plus y2 is about 1.

The invention provides, for the first time, sulfate materials usable as a source of lithium ($Li^+$) ions. Upon extraction of a quantity of lithium ions from the preferred $Li_xM_y(SO_4)_z$, ($Li_{x-a}M_y(SO_4)_z$) significant capacity is achieved. Such specific capacity achieved from preferred lithium-metal-sulfates is far in excess of the specific capacity from $Li_1Mn_2O_4$, ($Li_{1-x}Mn_2O_4$), $LiCoO_2$ ($Li_{1-x}CoO_2$), and $LiNiO_2$ ($Li_{1-x}NiO_2$) exemplary conventional cathode active materials. The preferred lithium-metal-sulfate of the invention has capacity as good as or better than the conventional materials. In the method of the invention, electrochemical energy is provided by deintercalation of lithium from lithium-metal-sulfates ($Li_{x-a}M_y(SO_4)_z$). This will be further explained below. In the case of a mixed alkali sulfate, the delithiation is represented by $Li_{(x1-a)}Na_{x2}M_y(SO_4)_z$, for example, $Li_{(2-a)}Na_1M_y(SO_4)_3$.

The general formula encompasses at least two preferred compounds each containing at least one alkali metal (A) and at least one other metal (M). One preferred compound is ferrinatrite. The original name was ferronatrite, from the content of iron and sodium. This was changed to ferrinatrite for consistency with the trivalent state of the iron in the mineral. The ferrinatrite is described as a Class 29, Type 4 sulfate according to Dana's System of Mineralogy, 7th Edition (1963), J. Wiley, New York, N.Y. The generic formula of Class 29 Type 4 is $A_mB_n(XO_4)_p$, often hydrated with water; m+n:p<3:2 and m+n:p>1:1. Thus, 1<(m+n)/p<1.5. Ferrinatrite, in this class and type, is $Na_3Fe(SO_4)_3$ often hydrated with $3H_2O$. Here (m+n)/p=4/3. Ferrinatrite is designated as 29.4.1 in Dana's System. The water is easily removed by drying. Ion substitution of Li for Na forms $Li_3Fe(SO_4)_3$. The ferrinatrite is found in nature, has the characteristics documented by K. Mereiter in TMPM Tschermaks Min. Petr. Mitt. 23, 317–321 (1976). The summary of Mereiter's findings are as follows. The crystal structure of ferrinatrite, $Na_3Fe(SO_4)_3 \cdot 3H_2O$, space group P$\bar{3}$ —$C_{3i}^1$, $a_o$=15.560 Å, $c_o$=8.666 Å, Z=6, was determined from x-ray intensities measured on a 2-circle diffractometer and was refined using 1591 independent $F_{obs}$ to R=0.047. $FeO_6$ octahedra and sulfate tetrahedra share common corners to form infinite chains $\frac{1}{\infty}\{Fe[SO_4]_3\}^{3-}$ which run parallel to z and are linked by sodium ions and water molecules. Important average bond lengths are: Fe—O= 1.997 Å, S—O=1.474 Å, Na-(4×0+2×Ow)=2.49 Å. The crystal system was determined to be rhombohedral (hexagonal setting).

Ferrinatrite may be prepared by action of concentrated sulfuric acid on sideronatrite. The sideronatrite is a Class 31, Type 5 sulfate according to Dana's System, and is represented by $A_3(XO_4)_2 Z_q$—hydrated, or $Na_2Fe(SO_4)_2(OH) \cdot 3H_2O$. (Class 31, Type 4, No. 31.5.3 per Dana.) Two additional methods are described in an article titled "Preparation and Radiocrystallographic Study of Double Sulfates of the Formula $M'_3M''(SO_4)_3$", by J. Bernard, P. Cochot, and F. Theobold; at the Lab. Chim. Phys., Fac. Sci., Besancon, Fr. SO.; published in the Journal C.R. Acad. Sci., Ser. C (1970), 270(12), 1119–1122. Two methods are presented for the preparation of $M'_3M''(SO_4)_3$ also written $M(I)M(III)(SO_4)_3$. Here M' represents the group of Na+, K+, Rb+, Cs+, and $NH_4^+$; and M'' represents the group of $Al^{+3}$, $Cr^{+3}$, and $Fe^{+3}$. The first method involves heating to 540° C., a 3 to 1 mole ratio mixture of the anhydrous sulfates $M(I)_2(SO_4)$ and $M(III)_2(SO_4)_3$. In the second method, these same sulfates are dissolved in water in a 3 to 1 mole ratio. The solution is evaporated, and the solid residue is heated to 400° C., except for M equals $NH_4^+$, when the temperature is lowered to 250° C. The double sulfates are hexagonal with Z=6. Exemplary unit cell parameter data are: $Na_3Al(SO_4)_3$, a=13.34, c=8.90 Å; $Na_3Cr(SO_4)_3$, a=13.39, c=9.01 Å; $Na_3Fe(SO_4)_3$, a=13.40, c=9.06 Å. These compounds are referred to as alkali metal transition metal sulfates, and also as double sulfates.

Other preferred compounds encompassed by $A_xM_y(SO_4)_2$ are derived from $Na_3Cr(SO_4)_3$, $NaCr(SO_4)_2$, $Na_3V(SO_4)_3$, and $NaV(SO_4)_2$ by ion substitution of Li for all or a part of the Na. $Na_3V(SO_4)_3$ and $NaV(SO_4)_2$ are prepared from $V_2O_5$ and $NaHSO_4$ melt at 420° C. under an $SO_2$ gas atmosphere. This is described by Boghosian et al in Acta Chemica Scandinavica, 48, 724–731 (1994). According to Boghosian, dark green crystals of the compound $Na_3V(SO_4)_3$ suitable for x-ray structure determination were synthesized by dissolution of $V_2O_5$ in $NaHSO_4$ melt at 420° C. under an $SO_2(g)$ atmosphere. Slow cooling of the solution from 420 to 320° C. over a period of one week gave a large number of small $Na_3V(SO_4)_3$ crystals. The compound crystallizes in the rhombohedral (hexagonal) space group R$\bar{3}$ with a=b=13.439(1), c=9.091(1) Å and Z=6. It contains two independent almost perfect $VO_6$ octahedra (within which equal V—O bond lengths are found) linked by three identical bridging sulfate groups as an infinite —V—$(SO_4)_3$— V— chain parallel to the c-axis. All oxygens coordinated to vanadium belong to the significantly distorted equivalent sulfate groups, which contain four different types of oxygen. The infrared and Raman spectra of polycrystalline $Na_3V(SO_4)_3$ and $NaV(SO_4)_2$ have been recorded and interpreted. The severe distortion of the sulfate groups within $Na_3V(SO_4)_3$ leads to a more complicated pattern of the vibrational spectra (i.e. IR activity of $v_1(SO_4^{2-})$ and extensive splitting of $V_3(SO_4^{2-})$ in the IR and Raman spectra) compared to $NaV(SO_4)_2$. Above 1500 $cm^{-1}$ the Raman spectra, particularly at lower temperatures, exhibit broad features which are interpreted as electronic Raman transitions between the $^3E_g$ and $^3A_g$ split levels of the $^3T_{1g}$ ($^3F$) ground state of $V^{3-}$ ($d^2$) in octahedral oxide fields. Crystal data according to Boghosian for $Na_3V(SO_4)_3$ is given in Table I. The IR spectra of dark green $Na_3V(SO_4)_3$ and bright green $NaV(SO_4)_2$ obtained at room temperature from finely ground powders in pressed KBr disks, resolution of about 5 cm$^{-1}$, are shown in FIG. 1.

The $Na_3Cr(SO_4)_3$ and $NaCr(SO_4)_2$ compounds also of the $AM(SO_4)_2$ general formula are formed from precursors similar to the $Na_3V(SO_4)_3$ and $NaV(SO_4)_2$ counterparts discussed above. The Cr compounds have been characterized by Kochubei et al in Zh. Neorg. Khim. 28(10), 2627–2630 (1983).

The above-described sodium metal sulfates are used to prepare the preferred lithium-metal-sulfate counterparts by ion substitution, which will now be described. The Na ion has an atomic radius of about 186 pm (half the interatomic distance for the element) and Li ion has a radius of about 152. Therefore, by substitution one is able to obtain isostructural product. This is in contrast to other alkali elements with large difference in radius where successful quantitative substitution may not occur. Methods for substituting Li for Na in metal oxide crystals include (1) soft chemistry, disintercalation (extraction), intercalation, and exchange reactions (Delmas et al (Revue de Chimie Minerale, 19, 343 (1982)) using an exchange solution of alkali halides in methanol; (2) high temperature, molten salt exchange agents to replace Na with Li: LiCl (650° C.); LiBr (560° C.); LiI (460° C.); LiNO$_3$ (300° C.); and mixtures of the above at temperatures as low as 260° C. (Fuchs et al, Solid State Ionics, 68, 279–285 (1994)); (3) multi-step solution process replacing Na with H, then replacing H with Li as described in U.S. Pat. No. 5,336,572 incorporated herein by reference in its entirety. Other ion substitution methods are described in U.S. Pat. Nos. 3,779,732; 3,959,000; and 3,992,179; each of which is incorporated herein by reference in its entirety. U.S. Pat. No. 3,992,179 shows a basic method for substituting Li for Na ions in a crystal structure. In one illustrative embodiment, a glass-ceramic article containing metal oxide compounds is treated with a lithium-containing ion-exchange material, such as the molten mixture of salts including lithium sulfate mentioned above, at an elevated temperature that is at least about 200° C. (about 400° F.), and preferably at least about 350° C. (about 660° F.), for a period of time to replace sodium ions by lithium ions in the glass matrix in a surface layer of the glass-ceramic article. Similarly, U.S. Pat. No. 3,959,000 shows a metal oxide material where Na ions are removed and Li ions are added by ion exchange. The sodium oxide compound of the metal oxide undergoes ion exchange to provide a lithium oxide compound, using molten salts, such as sodium sulfate and sodium nitrates. Sodium (Na)/lithium (Li) ion exchange using sulfate, nitrate, chloride, fluoride, and phosphate salts is discussed in U.S. Pat. No. 3,779,732. Among these, the Fuchs' method reportedly provides virtually complete replacement of Na by Li. In Fuchs, the exchange reactions were performed in molten salts of LiCl (650° C.); LiBr (560° C.), LiCl:LiBr=22:78 (530° C.), LiI (460° C.), LiNO$_3$ (300° C.), and LiNO$_3$:LiCl=88:12 (260° C.) at different temperatures (values in brackets) for 4 hours in flowing Ar. The products were separated from the melt by washing with methanol (>99.8%; Merck) and dried in a desiccator. Additionally, refluxing with Li salts (LiCl, LiBr, LiI, LiNO$_3$) in CH$_3$OH or CH$_3$CN under flowing Ar was applied. In summary, ion substitution is typically done by ion exchange, as by using a molten salt; or substitution is done by redox chemistry. By the exchange molten salt method, Fuch reports nearly complete replacement of Na by Li. Thus, $Na_3M(SO_4)_3$ goes to $Li_3M(SO_4)_3$. The redox chemistry method makes possible the formation of mixed alkali metal product. Here, the degree of Na removal is controlled according to the strength of the oxidizing agent. The lithium is put in either chemically or electrochemically. One additional way of doing the exchange could also be

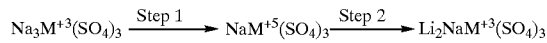

Step 1 is chemical or electrochemical deintercalation; and Step 2 is chemical or electrochemical intercalation. To prepare mixed transition metal compounds such as $Na_3V_{0.5}Fe_{0.5}(SO_4)_3$, Boghosian's method may be implemented using NaHSO$_4$, V$_2$O$_5$, and Fe$_2$O$_3$, or Fe$_2$(SO$_4$)$_3$. The resultant product is a solid solution, single compound, single structure. At some position in the structure V is present and Fe is present at other positions. Such solid solutions are also represented as $Li_xM'_qM''_q(SO_4)_3$.

In accordance with the above ion exchange, the preferred lithium-metal-sulfate compounds are formed for use in a lithium ion battery.

In another aspect, the invention provides a lithium ion battery which comprises an electrolyte; a negative electrode having an intercalation active material; and a positive electrode comprising a lithium-metal-sulfate active material characterized by an ability to deintercalate lithium ions for intercalation into the negative electrode active material. The lithium-metal-sulfate is represented by the nominal general formula $Li_xM_y(SO_4)_z$. In one aspect, the metal M represents a single metal, preferably a transition metal. In another aspect, the metal M represents a mixture of at least two metals M1 and M2 in a proportion to one another of $Y_1$, $y_2$, where the sum of $Y_1$ plus $Y_2$ is approximately equal to 1. Desirably, the sulfate is the compound $Li_3M_1(SO_4)_3$ where M is desirably a transition metal, and M is preferably vanadium (V), iron (Fe), chromium (Cr). In another desirable embodiment, the sulfate is $Li_1M_1(SO_4)_2$ where M is desirably a transition metal, preferably V, Fe, or Cr. A preferred compound is $LiV(SO_4)_2$. In the case where there are two metals M, the precursor solution contains more than one type of metal oxide.

The preferred lithium-metal-sulfate compounds are also represented by the nominal general formula $Li_{(3-a)}M_1(SO_4)_3$ and $Li_{(1-a)}M_1(SO_4)_2$, signifying their respective capability to deintercalate lithium. The present invention resolves a capacity problem posed by conventional cathode active materials. Such problems with conventional active materials are described by Tarascon in U.S. Pat. No. 5,425,932 using LiMn$_2$O$_4$ as an example. Similar problems are observed with LiCoO$_2$, LiNiO$_2$, and many, if not all, lithium metal chalcogenide materials. The present invention demonstrates that such capacity problems are overcome and greater proportion of potential in the cathode active material is utilized, especially with the Li$_3$ compound, providing a great improvement over conventional active materials.

The positive electrode active material in one embodiment, in an initial condition, is represented by the molecular formula $Li_{(3-a)}M(SO_4)_3$. When used in a cell, it deintercalates a quantity of "a" lithium ions for intercalation into the negative electrode where the amount of such "a" ions being intercalated is greater than 0 and less than or equal to 3. Accordingly, during cycling, charge and discharge, the value of the variable "a" varies as "a" greater than or equal to 0 and less than or equal to 3.

In another preferred embodiment, the positive electrode active material, in an initial condition, is represented by the molecular formula $Li_{(1-a)}M(SO_4)_2$. When used in a cell, it deintercalates a quantity of "a" lithium ions as described immediately above. However, in this case, the amount of "a" ions deintercalated is greater than 0 and less than or equal to 1; and during cycling, charge and discharge, the value of "a" varies as a greater than or equal to 0 and less than or equal to 1.

In the method of the invention, electrochemical energy is provided by deintercalation of lithium from lithium-metal-sulfates ($Li_3M(SO_4)_3$), and reinsertion using a counter-electrode which will now be described. For example, when 2 atomic units of lithium are removed per formula unit of the $Li_3V(SO_4)_3$, vanadium is oxidized from vanadium III (+3) to vanadium V (+5).

When 1lithium is removed per formula unit of the lithium vanadium sulfate, $V^{III}$ is oxidized to $V^{IV}$. The electrochemical reaction is as shown below:

Further extraction is according to:

Still further oxidation to remove the final lithium ion may not be practical given the available vanadium oxidation states. The extent of Li removal depends on the oxidation states of M or mixture of M metals. The theoretical removal of 1 Li from $LiV(SO_4)_3$ probably would result in $V_{0.5}^{+5}V_{0.5}^{+}{}_3(SO_4)_2$. In the case of $Li_3Cr(SO_4)_3$, theoretically all 3 atomic units of Li are removable. In the overall equation $Li_3Cr(SO_4)_3 \rightarrow Cr(SO_4)_3 + 3Li^+ + 3e^-$, this material has a theoretical capacity of about 223 milliamp hours per gram upon electrochemical oxidation as per the reaction shown herein. Here, the chromium goes from $Cr^{+3}$ to $Cr^{+6}$. The electrochemical extraction of lithium from $Li_xM_y(SO_4)_3$ is heretofore not known to have been described. Similarly, a mixed metal compound having two oxidizable elements is also not known.

Positive electrode lithium-metal-sulfate active material is prepared and used in an electrochemical cell. A typical cell configuration will be described with reference to FIG. 2.

Figure 2:
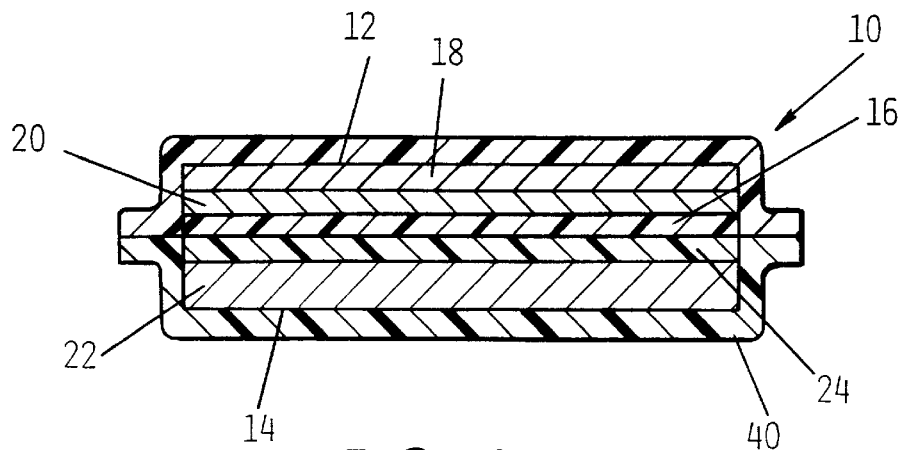
FIG. 2 is an illustration of a cross section of a thin battery or cell embodying the invention.

A description of an electrochemical cell or battery which uses the active material prepared according to the invention will now be provided. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 2, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes are typically referred to as polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used, that is stable up to 4.5 volts or more. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,418,091; 5,456,000; 5,460,904; 5,463,179; and 5,482,795. Each of the above patents is incorporated herein by reference in its entirety. Protective bagging material 40 covers the cell and prevents infiltration of air and moisture.

Electrodes of the invention are made by mixing a binder, the active material, and carbon powder (particles of carbon). The binder desirably is a polymer. A paste containing the binder, active material, and carbon is coated onto a current collector. The positive electrode comprises the lithium-metal-sulfate active material of the invention. For the positive electrode, the content is typically as follows: 50 to 90 percent by weight active material; 5 to 30 percent carbon black as the electric conductive diluent; and 3 to 20 percent binder, preferably chosen to enhance ionic conductivity. Stated ranges are not critical. The amount of active material may range from 25 to 85 weight percent. These materials are mixed and blended together with a solvent. Xylene is a suitable solvent. The mixture is then coated onto a current collector to achieve the desired thickness for the final electrode. The negative electrode of the invention preferably comprises about 80 to about 95 percent by weight of the specific graphite, and more preferably about 95 percent by weight, with the balance constituted by the binder. Preferably, the anode is prepared from a graphite slurry using polyvinylidene difluoride (PVDF) in a solvent along with the carbon particles. The slurry is coated onto a current collector using conventional application techniques.

The electrolyte used to form a completed cell may comprise any of a number of solvents, such as ethylene carbonate (EC), dimethyl carbonate (DMC), and mixtures thereof. The solvent contains typically a 1 molar solution of a lithium metal salt, such as $LiPF_6$. The positive and negative electrodes are maintained in a separated, spaced apart condition using a fiberglass layer or separator of an equivalent design.

The electrochemical cell which utilizes the positive electrode active material prepared according to the invention may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, for determining capacity of a positive electrode, test cells are usually fabricated using the lithium metal active material. When forming cells for use as batteries, it is preferred to use a non-metallic intercalation electrode.

Various methods for fabricating electrochemical cells and batteries and for forming electrode components are further described immediately below. The invention is not, however, limited by any particular fabrication method as the novelty lies in the unique electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; 4,830,939 (Lee & Shackle); and particularly 5,418,091; 5,456,000; and 5,460,904 assigned to Bell Comm. Research. Each of the above patents is incorporated herein by reference in its entirety.

TABLE I

Crystal data for $Na_3V(SO_4)_3$

| | |
|---|---|
| $M_w$/g mol$^{-1}$ | 408.095 |
| Crystal system | Rhombohedral (hexagonal setting) |
| Space group | $R\bar{3}$ |
| a/Å | 13.439 (1) |
| c/Å | 9.091 (1) |
| Z | 6 |
| V/Å$^3$ | 1421.92 |
| $D_c$/g cm$^3$ | 2.860 |
| $\mu$(MoK$\alpha$) | 18.46 |
| Crystal size/Thin | 0.19 × 0.15 × 0.09 |
| $\theta_{max}$/° | 40 |

It should be noted that the formulations illustrating the invention, such as $Li_3Fe(SO_4)_3$ and $Li_3V(SO_4)_3$, demonstrated capacity less than the achievable theoretical capacity when 2 or 3 Li units are assumed to be removed. Methods of preparation and cell configurations have not yet been optimized for the new, remarkable materials of the invention. Nevertheless, the materials are highly desirable as active materials to replace the widely used $LiMn_2O_4$, $Li_1CoO_2$, and $LiNiO_2$. The theoretical specific capacity for $Li_3M(SO_4)_3$ is about 200 milliamp hours per gram, depending on which metal or mixture of metals is used and assuming all 3 lithiums are extracted from the original starting material. The $Li_3Cr(SO_4)_3$ is an example where 3 Li units are extractable. For $Li_3V(SO_4)_3$, the capacity is about 150 milliamp hours per gram corresponding to about 66 milliamp hours for each of 2 atomic units of lithium extracted from the $Li_3V(SO_4)_3$ compound. It should be noted that lithium-metal-sulfate compounds are not known to have been prepared. Here, for the first time, is shown such compounds prepared from the sodium counterpart. There is also not known to have been an electrochemical use of the sodium-metal-sulfate precursors. Thus, the electrochemical reactions demonstrated by the present invention are remarkable as it has not heretofore been suggested. The product of the present invention may be contrasted to a compound having Nasicon ($Na_3Zr_2PSi_2O_{12}$) framework which is a skeleton structure with an interconnected interstitial space. There are also the Langbeinite-type ($K_2Mg_2(SO_4)_3$) structures which are true cage structures. Such structures do not permit mobility of alkali metal ions through the crystal. Some Nasicon-type structures possess ionic conductivity but have very poor electronic conductivity. Some Nasicon-type structures have been used as solid electrolytes, but are not usable as electrode materials. Many such Nasicon structures do not have an oxidizable metal in their structure, therefore, an ion cannot be extracted. Thus, such structures and compounds are useless for ion battery, rocking chair battery, application. For example, $Fe_2(SO_4)_3 \cdot XH_2O$ compounds are known and are categorized by Dana as Class 29, Type 8 (29.8.1 monoclinic). They are formed in the Nasicon or monoclinic structure. These structures are completely different from the rhombohedral structure of the $Li_3M(SO_4)_3$ compounds. The Type 8 compounds are not lithium-containing compounds and could only potentially be used as active material if a lithium metal counter-electrode was used. The $Li_3$ compounds of the invention have 3 Li atomic units per atomic unit of metal M, this results in far less weight for each unit of capacity.

In contrast to the known art, the present invention provides a lithium-metal-sulfate compound having lithium combined with an oxidizable metal in the compound. Such oxidizable metal is capable of more than one oxidation state. The metal is present in the lithium-metal-sulfate compound at less than its highest oxidation state. Therefore, the metal is oxidizable to provide capability to extract out one or more $Li^+$ ions. This is demonstrated by oxidation of V in $Li_3V(SO_4)_3$ from $V^{+3}$ to $V^{+5}$, and by oxidation of V in $LiV(SO_4)_2$ $V_{0.5}^{+3}V_{0.5}^{+5}$. It should be noted that there are many other combinations which may make possible extraction/insertion of Li in such lithium-sulfate compounds. The oxidation states for all such combinations are not verified, but are thought to be as per the examples. Note that the amount of $Li^+$ removed or added will determine the relative oxidation state of M or multiple M's (M1, M2, M3, etc.). Fe in $Li_3Fe(SO_4)_3$ from $Fe^{+3}$ to $Fe^{+4}$; Cr in $Li_3Cr(SO_4)_3$ from $Cr^{+3}$ to $Cr^{+6}$. In the case of $Fe^{+3} \rightarrow Fe^{+4}$, 1 unit of Li is extractable. This would also apply to $Li_3Mn(SO_4)_3$, $Li_3Ni(SO_4)_3$, and $Li_3Co(SO_4)_3$. In the case of $V^{+3} \rightarrow V^{+5}$, 2 Li are extractable; and for $Cr^{+3} \rightarrow Cr^{+6}$, 3 Li are extractable. In the case of $LiM1_{y1}M2_{y2}(SO_4)_3$, beginning with $Fe^{+3}$ and $V^{+3}$ the amount of Li extractable depends on the relative proportions of Fe and V and the final oxidation status, such as $Fe^{+3}V^{+3} \rightarrow Fe^{+3}V^{+5}$, and $Fe^{+3}V^{+3} \rightarrow Fe^{+4}V^{+5}$. For $LiM(SO_4)_3$, preferred compounds are $LiV(SO_4)_2$, $LiFe(SO_4)_2$, $LiMn(SO_4)_2$, $LiNi(SO_4)_2$, and $LiCo(SO_4)_2$, where theoretically 1 atomic unit of Li is extractable as the oxidation state of the M element increases by one.

Lithium ion batteries made with this technology are made in the discharged state and need a conditioning charge (pre-charge) before use. In the initial condition (pre-charged state), anodes of lithium ion batteries are essentially free of lithium, and often free of ions thereof, as in the case of graphite. Therefore, such batteries are inherently initially more stable and relatively less reactive than batteries containing lithium metal.

To achieve a useable potential difference, the (positive electrode) is electrochemically oxidized, while the anode (negative electrode) is reduced. Thus, during charging, a quantity (a) of lithium ions ($Li^+$) leave the positive electrode, $Li_{3-a}M'_yM''_{1-y}(SO_4)_3$, and the positive electrode is oxidized, increasing its potential; during charging, the Li ions are accepted at or intercalated into a negative electrode, preferably a carbon-based negative electrode, which is reduced. As a result, the negative electrode has a potential very close to the lithium metal potential, which is zero volts. A typical graphite electrode can intercalate up to about 1 atom of lithium per each of 6 carbons, that is, $Li_0C_6$ to $Li_1C_6$. During discharging, the reverse occurs, and a quantity of lithium ($Li^+$) ions leave the negative electrode, increasing its potential. During discharge, the lithium ions are accepted (intercalated) back into the positive electrode, which is reduced, and its potential is reduced.

If the $Li_3M'_yM''_{1-y}(SO_4)_3$ compound were used as a negative electrode, during charge, Li ions would be transferred to the negative electrode, as $Li_{(3+a)}M'_q{''}_{1-q}(SO_4)_3$ and the M', M'', or both, would achieve a lower oxidation state. Assuming M has a +3 initial oxidation state, this is expressed as $Li_3M^{+3}(SO_4)_3 \rightarrow Li_{(3+a)}M^{(3-a)+}(SO_4)_3 + aLi + ae^-$. In the case of M=$Fe^{+3}$, 1 Li may be inserted per formula unit of $Li_3Fe^{+3}(SO_4)_3$, leading to $Li_4Fe^{+2}(SO_4)_3$.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

I claim:

1. An electrode having an active material and a binder, said active material comprising a sulfate compound represented by the general formula $A_xM_y(SO_4)_z$; A represents an alkali metal (A1) or a mixture of at least two alkali metals (A1, A2) and the total amount of alkali metal is x atomic units, where x is 3; M represents a transition metal (M1) or a mixture of at least two transition metals (M1, M2) and the total amount of transition metal is y atomic units, where y is about 1; and z is 3.

2. The electrode according to claim 1 where A is selected from the group of sodium, lithium, and mixtures thereof.

3. The electrode according to claim 1 where A is lithium.

4. The electrode according to claim 1 where M is selected from the group consisting of Cr, Fe, V, Mn, Co, Ni, and mixtures thereof.

5. An electrode having an active material and a binder, said active material comprising a sulfate compound represented by the general formula $A_xM_y(SO_4)_z$; A represents an alkali metal (A1) or a mixture of at least two alkali metals (A1, A2) and the total amount of alkali metal is x atomic units, where x is 1; M represents a transition metal (M1) or a mixture of at least two transition metals (M1, M2) and the total amount of transition metal is y atomic units, where y is about 1; and z is 2.

6. The electrode according to claim 5 where A is selected from the group of sodium, lithium, and mixtures thereof.

7. The electrode according to claim 5 where A is lithium.

8. The electrode according to claim 5 where M is selected from the group consisting of Cr, Fe, V, Mn, Co, Ni, and mixtures thereof.

9. A battery which comprises a first electrode, and a second electrode which is a counter-electrode to said first electrode, said first electrode comprising an active material which is a compound of the general formula $A1_{x1}A2_{x2}M1_{y1}M2_{y2}(SO_4)_z$; where the sum of x1 plus x2 is greater than 0 and less than or equal to 3; the sum of y1 plus y2 is greater than 0 and is less than the sum of x1 plus x2; z is greater than 0 and less than or equal to 3; and A1 and A2 represent alkali metals and M1 and M2 represent transition metals.

10. The battery according to claim 9 having the compound with at least one of said A1 and A2 present; at least one of said M1 and M2 present and selected from the group consisting of V, Fe, Cr, Mn, Co, Ni and mixtures thereof.

11. The battery according to claim 9 having the compound nominal formula $Li_{x1}Na_{x2}M(SO_4)_z$ where x2 is less than x1.

12. The battery according to claim 9 having the compound selected from the group consisting of $Li_3V(SO_4)_3$, $Li_3Fe(SO_4)_3$, $Li_3Cr(SO_4)_3$, $Li_3V_{y1}Fe_{y2}(SO_4)_3$, $Li_{x1}V_{y1}(SO_4)_z$, $Li_{x1}Fe_{y1}(SO_4)_z$, $Li_{x1}Cr_{y1}(SO_4)_z$, $Li_{x1}V_{y1}Fe_{y2}(SO_4)_z$; $Li_{x1}Na_{x2}V(SO_4)_3$, $Li_{x1}Na_{x2}Fe(SO_4)_3$, $Li_{x1}Na_{x2}Cr(SO_4)_3$, $Li_{x1}Na_{x2}V_{y1}Fe_{y2}(SO_4)_3$, $Li_{x1}Na_{x2}V_{y1}(SO_4)_z$, $Li_{x1}Na_{x2}Fe_{y1}(SO_4)_z$, $Li_{x1}Na_{x2}Cr(SO_4)_z$, and $Li_{x1}Na_{x2}V_{y1}Fe_{y2}(SO_4)_z$.

13. A compound having the nominal formula $Li_{x1}Na_{x2}M(SO_4)_z$, where x2 is less than x1 and M is selected from the group consisting of V, Fe, Cr, Mn, Co, Ni, and mixtures thereof; provided that the sum of x1 plus x2 is greater than 0 and less than or equal to 3; and z is greater than 0 and less than or equal to 3.

14. A compound of the general formula $A1_{x1}A2_{x2}M1_{y1}M2_{y2}(SO_4)_z$; where the sum of x1 plus x2 is greater than 0 and less than or equal to 3; y1 and y2 are as defined below; z is greater than 0 and less than or equal to 3; and A1 and A2 represent alkali metals and M1 and M2 represent transition metals; provided that the compound is selected from the group consisting of $Li_3V(SO_4)_3$, $Li_3Fe(SO_4)_3$, $Li_3Cr(SO_4)_3$, $Li_3V_{y1}Fe_{y2}(SO_4)_3$, $Li_{V1}(SO_4)_2$, $Li_1Fe_1(SO_4)_2$, $Li_1Cr(SO_4)_2$, $Li_1V_{y1}Fe_{y2}(SO_4)_2$; where y1 and y2 are each greater than 0, and the sum of y1 plus y2 is about 1.

15. A compound of the general formula $A1_{x1}A2_{x2}M1_{y1}M2_{y2}(SO_4)_z$; where the sum of x1 plus x2 is greater than 0 and less than or equal to 3; y1 and y2 are as defined below; z is greater than 0 and less than or equal to 3; and A1 and A2 represent alkali metals and M1 and M2 represent transition metals; provided that the compound is selected from the group consisting of $Li_{x1}Na_{x2}V(SO_4)_3$, $Li_{x1}Na_{x2}Fe(SO_4)_3$; $Li_{x1}Na_{x2}Cr(SO_4)_3$, $Li_{x1}Na_{x2}V_{y1}Fe_{y2}(SO_4)_3$, $Li_{x1}Na_{x2}V_1(SO_4)_2$; $Li_{x1}Na_{x2}Fe_1(SO_4)_2$, $Li_{x1}Na_{x2}Cr(SO_4)_2$, $Li_{x1}Na_{x2}V_{y1}Fe_{y2}(SO_4)_2$; where y1 and y2 are each greater than 0, and the sum of y1 plus y2 is about 1.

16. An electrode having an active material and a binder, said active material comprising a sulfate compound represented by the general formula $A_xM_y(SO_4)_z$; A represents an alkali metal (A1) or a mixture of at least two alkali metals (A1, A2) and the total amount of alkali metal is x atomic units, where x is greater than 0 and less than or equal to about 3; M represents a mixture of at least two transition metals (M1, M2) and the total amount of transition metal is y atomic units, where y is about 1; and z is greater than 0 and less than or equal to about 3; and where M consists of M1 and M2, M1 is V and M2 is Fe.

17. An electrode having an active material and a binder, said active material comprising a sulfate compound represented by the general formula $A_xM_y(SO_4)_z$; A represents an alkali metal (A1) or a mixture of at least two alkali metals (A1, A2) and the total amount of alkali metal is x atomic units, where x is greater than 0 and less than or equal to about 3; M represents a mixture of at least two transition metals (M1, M2) and the total amount of transition metal is y atomic units, where y is about 1; and z is greater than 0 and less than or equal to about 3; and M1 is V and M2 is selected from the group consisting of Cr, Fe, V, Mn, Co, Ni and mixtures thereof.

18. An electrode having an active material comprising a sulfate compound of the general formula $Li_{(x1-a)}Na_{x2}M_y(SO_4)_z$, where in a first condition, a equals 0; x1 is greater than 0 and less than or equal to about 3; x2 is greater than or equal to 0 and less than or equal to x1; and the sum of x1 and x2 is up to about 3; M represents a transition metal (M1), or a mixture of at least two transition metals (M1, M2, . . . ), and the total amount of transition metal is y atomic units where y is about 1; and z is greater than 0 and less than or equal to about 3; at least one of said transition metals has more than one oxidation state; and said active material having a second condition representing a characteristic delithiation where a is greater than 0 and less than or equal to x1; provided said first condition of said compound is represented by one of the following nominal formulas: $Li_3M_1(SO_4)_3$; $Li_1M_1(SO_4)_2$; $Na_3M_1(SO_4)_3$; $Li_{x1}Na_{x2}M_1(SO_4)_3$, x1 and x2 are both greater than 0, x1 plus x2 equals 3, and x2 is less than x1; $Na_1M_1(SO_4)_2$; and $Li_{x1}Na_{x2}M_1(SO_4)_2$, x1 and x2 are both greater than 0, x1 plus x2 equals 1, and x2 is less than x1.

* * * * *